United States Patent [19]

McNeal et al.

[11] 4,327,561
[45] May 4, 1982

[54] HIGH COEFFICIENT OF PERFORMANCE HEAT PUMP

[76] Inventors: G. Russell McNeal, 1929 N. Osage; Joseph R. McNeal, 1308 Bradbary, both of Ponca City, Okla. 74601

[21] Appl. No.: 161,458

[22] Filed: Jun. 20, 1980

[51] Int. Cl.³ ............................................. F25B 13/00
[52] U.S. Cl. .................................. 62/324.1; 62/238.6; 62/324.6
[58] Field of Search ................. 62/324.4, 238.6, 238.1, 62/160, 324.1

[56] References Cited

U.S. PATENT DOCUMENTS

| | | | |
|---|---|---|---|
| 2,893,218 | 7/1959 | Harnish | 62/324.1 X |
| 3,066,497 | 12/1962 | Dubberley | 62/299 |
| 3,145,545 | 8/1964 | Jaeger | 62/323 |
| 3,188,829 | 6/1965 | Siewert et al. | 62/238.6 X |
| 3,307,368 | 3/1967 | Harnish | 62/324.1 X |
| 3,394,736 | 7/1968 | Pearson | 138/38 |
| 3,513,663 | 5/1970 | Martin, Jr. et al. | 62/159 |
| 4,098,092 | 7/1978 | Singh | 62/324.1 X |
| 4,102,390 | 7/1978 | Harnish et al. | 62/324.1 X |
| 4,104,044 | 8/1978 | Lange | 62/324 |
| 4,262,492 | 4/1981 | Morita et al. | 62/324.6 |

OTHER PUBLICATIONS

"Popular Science," Feb., pp. 98–100 (1979).

Primary Examiner—Lloyd L. King
Attorney, Agent, or Firm—Jack N. Shears

[57] ABSTRACT

A high coefficient of performance heat pump which extracts heat from or inputs heat into a liquid comprises a refrigerant compressor, a refrigerant, a plurality of refrigerant-fluid heat exchangers, two refrigerant expanders, two refrigerant check valves, a three way valve, refrigerant conduits, and liquid conduits connected in fluid tight communication. The apparatus can be employed to extract heat from or input heat into the earth, while heating or cooling air and/or water. An improved evaporator, refrigerant-liquid heat exchanger, component hook-up, and valve design are preferred embodiments.

13 Claims, 11 Drawing Figures

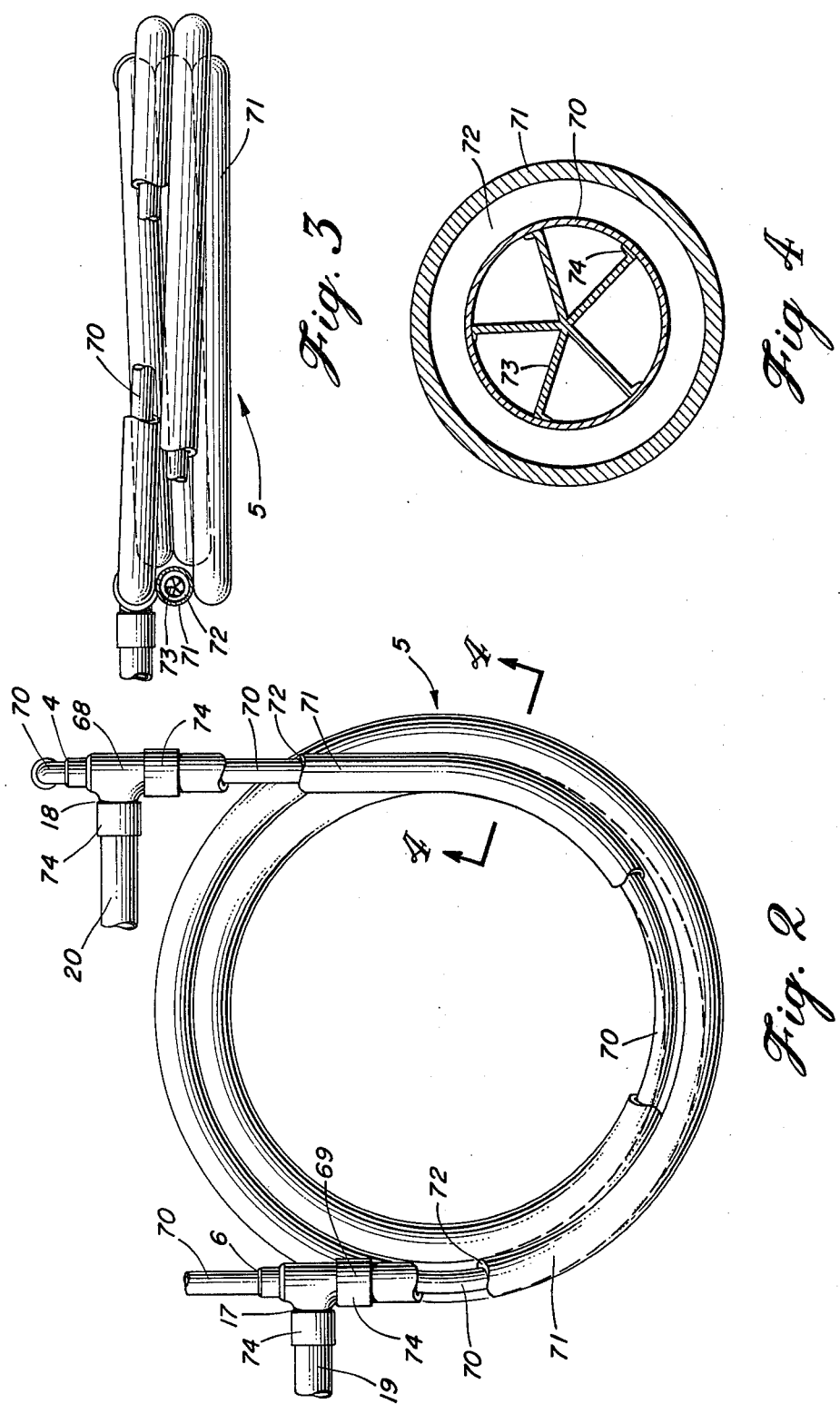

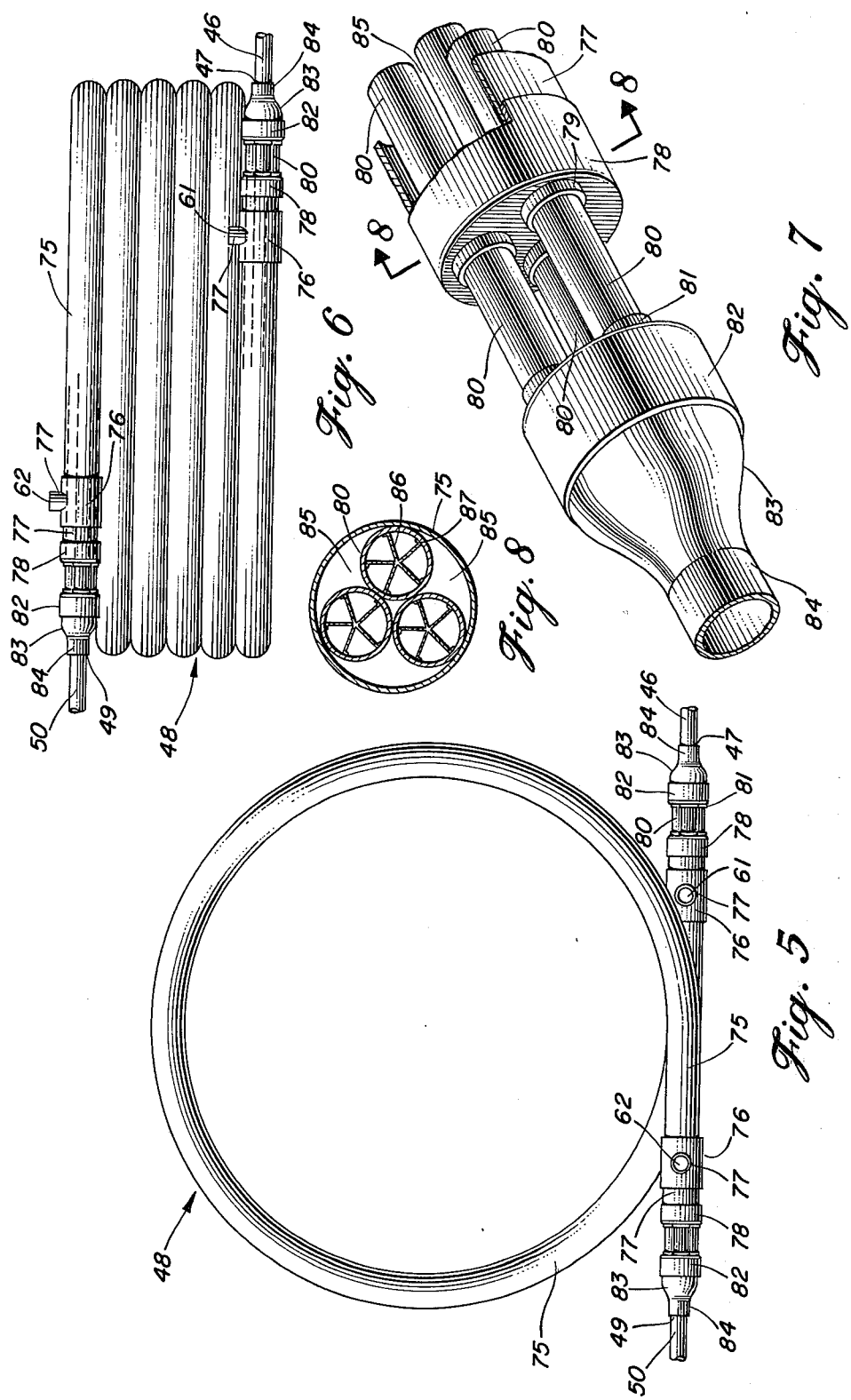

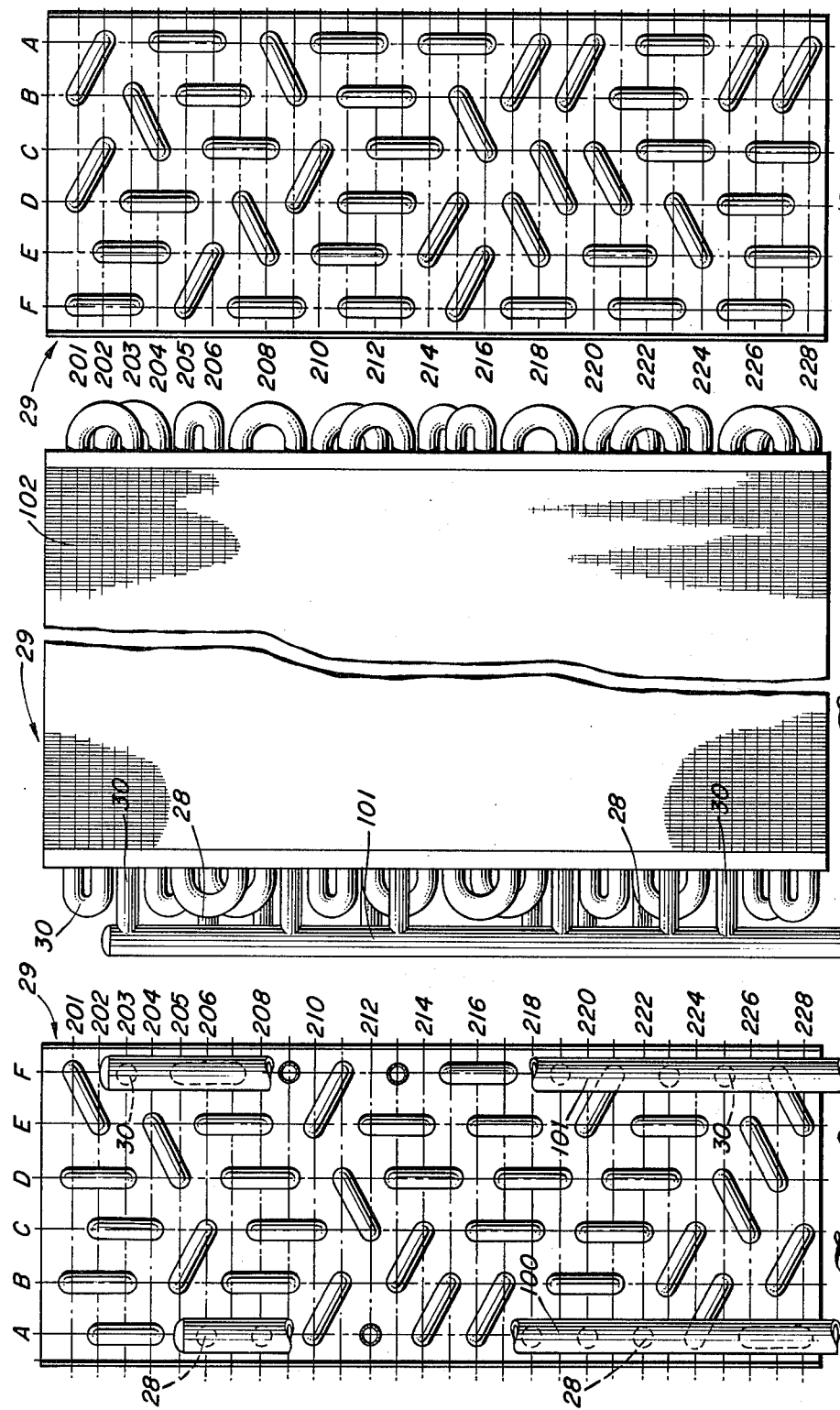

HIGH COEFFICIENT OF PERFORMANCE HEAT PUMP

BACKGROUND OF THE INVENTION

The invention relates to heat pumps.

Brief Description of the Prior Art

The following, inter alia, is intended to be a prior art statement in accord with the guidance and requirements of 37 CFR1.5, 1.97, and 1.98.

Heat pumps, that is, devices for moving heat from one environment to a second environment or vice versa as desired, constitute one of the most promising ways of providing clean and efficient space heating, cooling, and water heating for homes and industry, particularly in regions that lack adequate supplies of natural gas. If Coefficient of Performance (COP) of such devices can be raised sufficiently, very large savings in energy can be obtained.

A large preponderance of heat pumps on the market heat interior space by extracting heat from the outside atmosphere, and have provision for reversing the process to cool interior space by dumping heat into the atmosphere by an evaporator equiped with a large volume fan for dispersing the heat. U.S. Pat. Nos. 4,104,044 and 3,066,497 exemplify fairly typical installations. These air to air heat pumps can and do save substantial energy when there is not too great a difference in the temperature of the interior space and the outside atmosphere. However, as the difference in the temperatures becomes greater, efficiency is lost until it becomes more efficient to heat by resistance heating and large amounts of energy are needed to air condition the interior space. This has limited the practicality of heat pumps in cold climates. This plus the relatively high energy requirement to heat exchange with the atmosphere has typically limited COP values to a conventional range of about 2.

Much better efficiencies can be obtained by heat exchanging the interior space against a liquid such as an aqueous liquid. U.S. Pat. No. 3,513,663 exemplifies a heat pump system exchanging heat with water pumped from a well. In effect this is a ground heat assisted or a solar assisted heat pump system, wherein the earth is the solar collector. With solar assisted systems, COP in the heating mode can be increased to values potentially as high as 5 to 6. An excellent introduction to ground-heat-augmented heat pump systems is found in Popular Science, Feb., 1979, p 99–100. Further details can be found in the reports to the U.S. Department of Energy under DOE Contract Number EM-78-S-01-4257 associated with the work done by Dr. Bose which is summarized in the Popular Science article, herewith incorporated by reference. In effect, very substantial energy savings can be obtained by employing a heat pump to heat or cool interior space and to heat domestic water when exchanging heat against an aqueous liquid circulated through an earth coil or in a cased-in well. The 68° F. constant earth temperature of the latitude of Oklahoma is very favorable for such a system, but even ground temperatures in the 50's found in the Northern United States are still much more favorable for heating than winter air temperatures when heating is needed. Much greater efficiencies can be obtained exchanging against an aqueous liquid as compared to air.

This invention, then, involves an improved high COP heat pump apparatus and process which are particularly useful for solar augmented heating or ground-heat-augmented heating and cooling systems.

In one of the embodiments of the improved heat pump of this application an improved refrigerant-liquid heat exchanger is disclosed. U.S. Pat. Nos. 3,394,736 and 3,145,545 are relevant to this embodiment but are not believed to disclose or render obvious this embodiment.

A searcher who conducted a pre-examination search relating to this application also cited the following references: Brit. Pat. Nos. 1,307,604; 1,355,645; U.S. Pat. Nos. 2,042,812; 2,125,842; 2,263,476; 2,441,885; 2,407,547; 2,516,093; 2,709,897; 2,759,334; 2,894,375; 2,940,281; 2,944,408; 3,005,320; 3,060,698; 3,110,162; 3,153,913; 3,306,368; 3,352,126; 3,464,227; 3,538,961; 3,752,185; 3,753,356; 3,959,986; 3,992,896; 4,017,286; and 4,102,389. None of these references presently appear to be more closely related than in providing background in related arts or being exemplary of the general state of the art. No representations are made as to thoroughness or exhaustiveness of the pre-examination search which was conducted.

Objects of the Invention

An object of the invention is to provide a high COP heat pump and process which are suitable for heating domestic water and/or heating or cooling the air in an interior space.

SUMMARY OF THE INVENTION

An improved heat pump suitable for heating air by extracting heat from a liquid or cooling air by inputting heat into a liquid is disclosed. It comprises a refrigerant compressor, a refrigerant-air heat exchanger, a refrigerant-liquid heat exchanger, refrigerant, a first refrigerant expansion means, a second refrigerant expansion means, a first check valve means, a second check valve means, a first filter-dryer means, a second filter-dryer means, a three way valve means, a plurality of refrigerant conduit means, and a plurality of liquid conduit means.

In one aspect, the heat pump is employed to heat and cool interior space by extracting and dispersing heat into an aqueous liquid in heat exchange relationship with the earth, as by an earth coil or a cased-in well.

In another aspect, an improved refrigerant-liquid heat exchanger is employed.

In another aspect, an improved evaporator for refrigerant-air heat exchange is employed.

In another aspect, an embodiment suitable for heating domestic water in addition to heating and cooling interior space is disclosed.

In yet another aspect, an embodiment suitable for extracting heat from an aqueous liquid to heat water is disclosed.

BRIEF DESCRIPTION OF THE DRAWINGS

FIG. 2 is a bottom view of a refrigerant-aqueous liquid heat exchanger similar to refrigerant-aqueous liquid heat exchanger 5.

FIG. 3 is a side view of FIG. 2.

FIG. 4 is a cross section taken along plane 4—4.

FIG. 5 is a top view of a primary refrigerant-liquid heat exchanger similar to primary refrigerant-liquid heat exchanger 48.

FIG. 6 is a side view of FIG. 5.

FIG. 7 is a perspective view with partial cut-aways showing detail of the end construction of the exchanger.

FIG. 8 is a cross-section view taken along plane 8—8.

FIG. 9 is a semi-schematic side view of the improved refrigerant-air heat exchanger.

FIG. 10 is a downstream view of the improved refrigerant-air heat exchanger.

FIG. 11 is a semi-schematic side view of the improved refrigerant-air heat exchanger from the side opposite that shown in FIG. 9.

DESCRIPTION OF THE DRAWINGS

Figure 1:
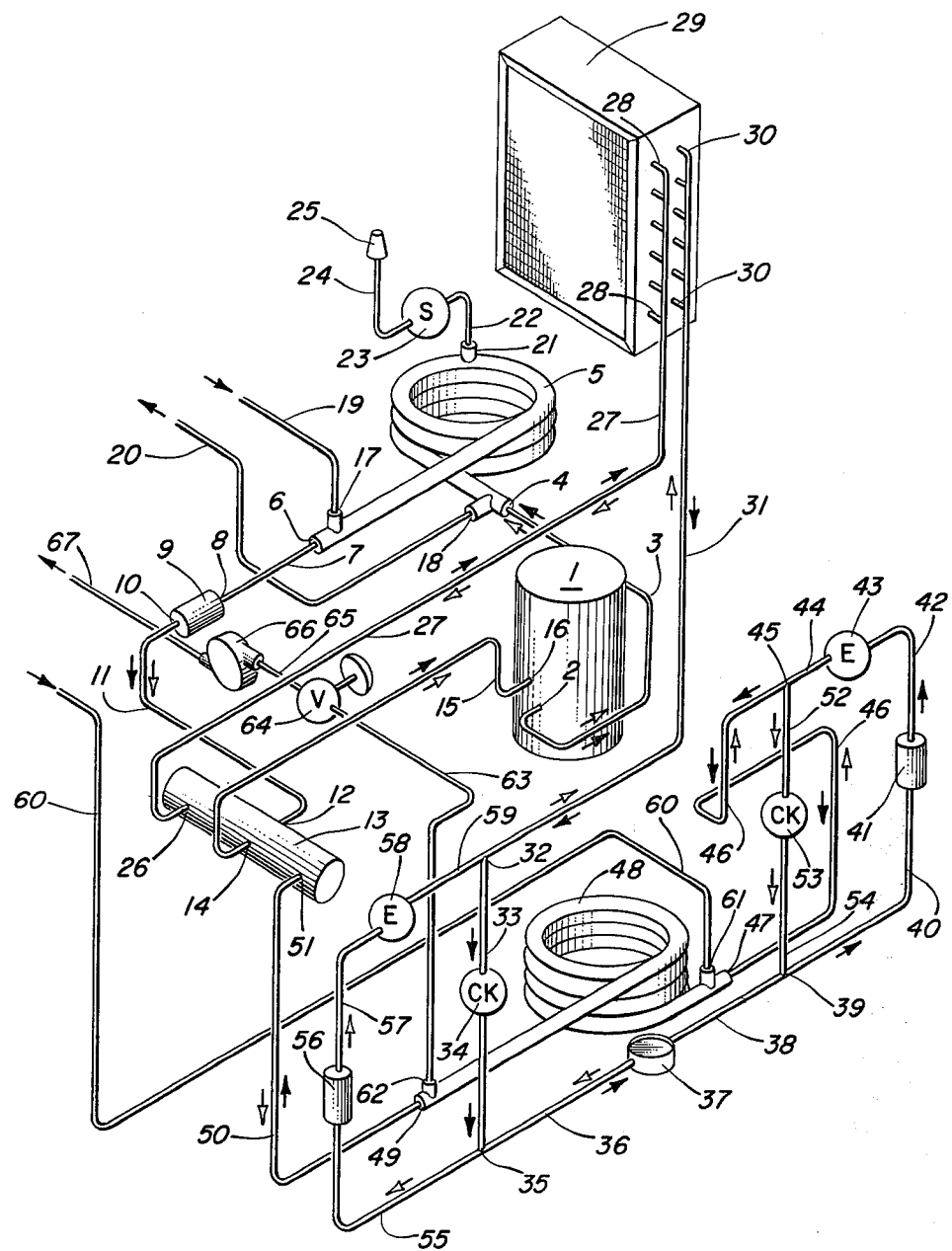
FIG. 1 is a schematic of a presently preferred embodiment of the heat pump which is suitable for extracting heat from an aqueous liquid to heat air in interior space and which is also suitable for heating domestic water.

FIG. 1 shows a schematic of a presently preferred embodiment of the improved heat pump apparatus of the invention in which the process of that preferred mode can be visualized.

Thus, refrigerant compressor 1 has an outlet 2 for compressed, heated, and liquified refrigerant and an inlet 16 for evaporated and cooled refrigerant. Outlet 2 connects in fluid tight communication via refrigerant conduit means 3 to inlet 4 of second refrigerant-aqueous liquid heat exchanger 5 having outlet 6. Outlet 6 connects via refrigerant conduit 7 to inlet 8 of filter-dryer 9, having outlet 10. Outlet 10 connects via refrigerant conduit 11 to inlet 12 of three way valve 13.

Three way valve 13 has return outlet 14 which connects via refrigerant conduit 15 to inlet 16 of refrigerant compressor 1.

FIG. 2 shows more complete detail of the second refrigerant-aqueous liquid heat exchanger 5. According to the embodiment and preferred mode presently being described, it has an inlet 17 and an outlet 18 for circulating of aqueous liquid, for example, via conduit 19 from the lower end of a domestic hot water tank, pre-heat tank therefor, or the heat exchanger in either.

According to one preferred mode, the water conduit of refrigerant-aqueous liquid heat exchanger 5 has outlet 21 connecting via conduit 22, valve 23, and conduit 24 to humidifier head 25 for adding humidity in the heating (for air) mode of the system.

To aid in visualization of the operation of the apparatus, refrigerant flow is shown by open arrows for the cooling (for air) mode and by closed arrows in the heating mode.

Three way valve 13, in addition to inlet 12 for compressed, heated, and liquified refrigerant and return outlet 14 for evaporated and cooled refrigerant, also has first alternate opening 26 (which is the heating mode outlet and cooling inlet for the refrigerant) and second alternate opening 51 (which is the heating mode inlet and cooling mode outlet for the refrigerant). The three way valve is sometimes called a reversing valve.

The first alternate opening 26 connects via refrigerant conduit 27 to first refrigerant openings 28 of refrigerant-air heat exchanger 29, shown in more detail in FIGS. 9, 10, and 11. First refrigerant openings 28 are inlets for the heating mode (for air) and outlets for the cooling mode.

Second refrigerant openings 30 of refrigerant-air heat exchanger 29 connect via refrigerant conduit 31, via junction 32, via refrigerant conduit 33, via open check valve 34, via junction 35, via refrigerant conduit 36, via sight glass 37, via refrigerant conduit 38, via junction 39, via refrigerant conduit 40, via filter-dryer 41, via refrigerant conduit 42, via first refrigerant expansion means 43, via refrigerant conduit 44, via junction 45, and via refrigerant conduit 46, to first refrigerant opening 47 (which is the heating mode refrigerant inlet and cooling mode refrigerant outlet) of the primary refrigerant-liquid heat exchanger 48.

Second refrigerant opening 49 of the primary refrigerant liquid heat exchanger 48 connects via refrigerant conduit 50 to second alternate opening 51 of three way valve 13.

Junction 45 also connects in an alternate path via refrigerant conduit 52, via open check valve 53, via refrigerant conduit 54, via junction 29, via refrigerant conduit 38, via sight glass 37, via refrigerant conduit 36, via junction 35, via refrigerant conduit 55, via filter-dryer 56, via refrigerant conduit 57, via second refrigerant expansion means 58, and via refrigerant conduit 59 to junction 32.

Aqueous liquid conduit 60 connects via inlet 61, via the annulus of the primary refrigerant-liquid heat exchanger 48, via outlet 62, via aqueous liquid conduit 63, and via valve 64, via aqueous liquid conduit 65, via pump 66, and to aqueous liquid conduit 67.

Aqueous liquid conduits 60 and 67 can connect to an earth coil, a deep well, a water source or other liquid means of extracting heat from the earth or out-putting heat into the environment.

Referring to FIGS. 2, 3, and 4, showing complete detail of the second refrigerant-aqueous liquid heat exchanger 5, conduit 19, connects to aqueous liquid inlet fitting 69 with sleeve 74, as by way of a sweated solder connection. Fitting 69 also connects to jacket 71 of the exchanger with sleeve 74 and a solder sweat seal. Jacket 71 is a copper tubing of suitable size. It connects on its other end to fitting 68 by means of sleeve 74 and a solder sweat. The fittings, jacket, and conduits are preferably fabricated of copper for corrosion resistance, ease of fabrication, ready availability, and good heat transfer. Fitting 68 connects to conduit 20 by way of sleeve 74 and a solder sweat, defining aqueous liquid outlet 18.

Refrigerant conductor 70, which connects to refrigerant conduit 3 outward of inlet 4, passes through necked down portion of fitting 68, being solder sweated at the necked down portion, through the interior of jacket 71, and out through the necked down portion of fitting 69 to connect to refrigerant conduit 7 outward of outlet 6. The annulus 72 between the jacket 71 and the refrigerant conductor 70 provides for circulation of aqueous liquid in heat exchange relationship with the heated, compressed, and liquified refrigerant.

Very efficient heat exchange between the refrigerant circulating within refrigerant conductor 70 and circulating aqueous liquid in annulus 70 is provided by star conductor 73 having extra contact area at its feet 74.

FIGS. 5, 6, 7, and 8, show detail of primary refrigerant-liquid heat exchanger 48.

Thus, aqueous liquid conduit 60 can connect via inlet 61 by means of connector portion 77 of T-fitting 76 by means of a conventional solder sweat.

Aqueous liquid is in fluid communication from inlet 61 to outlet 62 by way of annulus 85 formed between refrigerant conductors 80 and jacket 71. Aqueous liquid conduit 63 can connect via outlet 62 by means of a conventional solder sweat to provide for circulation of aqueous liquid through annulus 75 in heat exchange relationship with refrigerant circulated through refrigerant conductors 80.

Excellent heat exchange between the refrigerant circulating in the refrigerant conductors 80 and aqueous liquid circulating through annulus 85 is promoted by star conductors 86 having broad contact feet 87.

Unique connection means on each end of the exchanger provide for leak free connection and are described as follows. A T-fitting 76 is solder sweated to each end of jacket 75, each fitting is solder sweated to a connector 77, which in turn is solder sweated to a cap joint 78.

The cap joint 78 has fitting openings 79 through which refrigerant conductors 80 pass and are solder sweated.

The ends of refrigerant conductors 80 terminate and are solder sweated within fittings 81 of distributer fittings 82 which have neck-down portions 83 terminating in fitting openings 84 adapted for solder sweating to refrigerant conduits 46 and 50.

Preferably all of the primary refrigerant-liquid heat exchanger 40 is fabricated of copper for superior corrosion resistance, ease of fabrication, ready availability or fabricability of components, and good heat transfer, except for star conductors 86. Star conductors 86 are preferably fabricated of aluminum.

FIGS. 9, 10, and 11 shows detail of refrigerant-air heat exchanger 29.

Thus, first refrigerant openings 28, which are inlets for the heating mode and outlets for the cooling mode, connect via header 100 to refrigerant conduit 27 (as show in FIG. 1). In similar manner second refrigerant openings 30, which are outlets for the heating mode and inlets for the cooling mode, connect via header 101 to refrigerant conduit 31 (as shown in FIG. 1).

As shown in the drawings a series of refrigerant tubes cross back and forth through the refrigerant-air heat exchanger and connect via U fittings on each end. Radiating fins 102 having passageways for the refrigerant tubes are positioned as shown. Air flow is from left to right in FIG. 9, right to left in FIG. 11, and toward the viewer in FIG. 10.

A grid system lettered A to F and 202 to 288 is shown in the drawings, and will later be employed to describe passage of refrigerant through the refrigerant tubes from header 100 to header 101.

Air is passed through the exchanger by a conventional fan which is often a conventional squirrel cage fan.

Preferred Embodiments of the Invention

A description of a presently preferred mode of the invention follows, in which reference is primarily made to FIG. 1, but in which reference is made to the other Figures as appropriate.

In accord with this preferred mode, a conventional refrigerant compressor 1 compresses a refrigerant such as F 22 halogenated hydrocarbon (chlorodifluoromethane). The refrigerant which is compressed and consequently heated and liquified in the compressor exits via outlet 2 and passes via refrigerant conduit 3 and inlet 4 into the second refrigerant aqueous liquid heat exchanger 5.

The heat exchanger 5 is advantageously employed to heat domestic hot water which is circulated through the annulus of the heat exchanger, entering by inlet 17 and exiting by outlet 18. The rest of the water heating circuit can comprise a domestic hot water tank, a pre-heat tank upstream of a conventional domestic hot water tank, or a heat exchanger within either. A suitable pump and automatic controls or the thermosiphon effect can be employed in the water heating circuit. It should be noted that the domestic water is heated in either the heating or cooling mode. In the heating mode, the domestic hot water is heated with much greater efficiency than by resistance heating. In the cooling mode, heating of the domestic hot water is "free" since the heat is being dumped anyway. The design of the heat exchanger 5 is preferably as shown in FIGS. 2, 3, and 4, which provides for very high efficiency.

The heated, liquified, and compressed refrigerant, gives up a varying amount of its heat in heat exchanger 5 to the domestic hot water system, depending on demand and incoming water temperature. It then exits the heat exchanger 5 by way of outlet 6, and passes, still in the liquid, compressed, and heated state via refrigerant conduit 7 into filter-dryer 9 via inlet 8. Refrigerant filter-dryer 9 can be any conventional refrigerant filter-dryer for removing particulates and moisture from a refrigerant stream.

The refrigerant passes from refrigerant filter-dryer 9 by way of outlet 10 and then via refrigerant conduit 11 to inlet 12 of three way valve 13.

Three way valve 13 can be any conventional refrigerant reversing valve capable of shunting a refrigerant stream which enters via an inlet 12 through either a first alternate opening 26 and a circuit and back through a second alternate opening 51 to a return outlet 14, or through the second alternate opening 51, and a circuit and back through the first alternate opening 26 to the return outlet 14, as determined by a control thereon. One non-limiting example of a suitable three way valve is the V 47-2001 Ranco reversing valve available commercially from Waugh Bros. Supply Co., 2015 N.W. 7th, Oklahoma City, OK 73106, among others.

Evaporated, cooled, and gaseous refrigerant from both heating mode and cooling mode circuits or paths returns to refrigerant compressor 1 from three way valve 13 via outlet 14, refrigerant conduit 15 and inlet 16.

In the heating mode, compressed, liquified, and heated refrigerant passes from three way valve 13 via first alternate opening 26 and via refrigerant conduit 27 into refrigerant-air heat exchanger 29 via refrigerant openings 28. The refrigerant-air heat exchanger can be a conventional evaporator connecting through a duct system to the interior space to be heated or cooled. More preferably it is an evaporator having features as described in connection with FIGS. 9, 10, and 11. Air is passed through such an evaporator by a fan such as a conventional squirrel cage fan.

In the heating mode, the remaining heat, not previously imparted to the water heated in the second refrigerant-aqueous liquid heat exchanger 5 is given up to the air and circulated in the interior space.

The cooled, but still compressed and liquid refrigerant exits the refrigerant-air heat exchanger via second refrigerant openings 30 and passes via refrigerant conduit 31, via junction 32, via refrigerant conduit 33, via open check valve 34, via junction 35, via refrigerant conduit 36, via sight glass 37, via refrigerant conduit 38, via junction 39, via refrigerant conduit 40, via filter-dryer 41, and via refrigerant conduit 42 through first refrigerant expansion means 43. On passing through refrigerant expansion means 43 pressure is decreased allowing the beginning of evaporation to the gaseous state. All of these items downstream of the refrigerant-air heat exchanger 29 are conventional and are available as items of commerce.

The expanded refrigerant exiting from the expansion means 43 passes via refrigerant conduit 44, via junction 45, via refrigerant conduit 46, and via first refrigerant opening 47 into primary refrigerant-liquid heat exchanger 48.

Primary refrigerant-liquid heat exchanger 48 has detail as shown in FIGS. 5, 6, 7, and 8. Therein heat passes from liquid circulated in the annulus into the evaporating refrigerant. Aqueous liquid is circulated through the annulus from a heat source via aqueous liquid conduit 60, and inlet 61. It passes from the annulus via outlet 62 and via aqueous liquid conduit 63 and controller valve 64 to discharge via pump 66 and aqueous liquid conduit 67.

In a presently preferred mode, aqueous liquid conduit 60 connects in exchange relationship to a heat source as does aqueous liquid conduit 65. Preferably the aqueous liquid is circulated in an earth coil below the frost line or down a tubing string and up the annulus of a cased in well thereby absorbing heat from the earth.

The evaporated refrigerant, after taking up heat in primary refrigerant-liquid heat exchanger 28, exits via second refrigerant opening 49, and passes via refrigerant conduit 50 to second alternate openings 51 of three way valve 13. In the heating mode, the expanded refrigerant is passed from the three way valve 13 back to the compressor 1 via return outlet 14, via refrigerant conduit 15, and via inlet 16.

In the cooling mode, compressed liquified, and heated refrigerant passes from three way valve 13 via second alternate opening 51. It then passes via refrigerant conduit 50 to primary refrigerant-liquid heat exchanger 50 via second refrigerant opening 49. Therein it gives up heat to liquid circulated through the annulus thereof via inlet 61 and outlet 62.

The cooled, but still compressed and liquid refrigerant, exits the primary refrigerant-liquid heat exchanger by way of first refrigerant opening 47. It then passes via refrigerant conduit 46, via junction 45, via refrigerant conduit 52, via open check valve 53, via refrigerant conduit means 54, via junction 39, via refrigerant conduit means 38, via sight glass 37, via refrigerant conduit means 26, via junction 35, via refrigerant conduit 55, via filter-dryer 56, and via refrigerant conduit 57 to second refrigerant expansion means 58.

On passing through refrigerant expansion means 58, the pressure on the liquid refrigerant is reduced and expansion begins.

The evaporating refrigerant passes from refrigerant expansion means 58 via refrigerant conduit 59, via junction 32, and via refrigerant conduit 31 to refrigerant-air heat exchanger 29 via first refrigerant openings 30. Therein it takes up heat from the air passing in heat exchanger relationship therwith. In other words, air is cooled by passing through the evaporator.

The gaseous refrigerant then exits from the refrigerant-air heat exchanger via openings 29 and passes via refrigerant conduit 27 to three way valve 13 via first alternate opening 26. In the cooling mode, the expanded refrigerant is also passed from the three way valve 13 back to the compressor 1 via return outlet 14, via refrigerant conduit 15, and via inlet 16.

The second refrigerant-aqueous liquid heat exchanger 5 is readily fabricated from conventional items readily available as items of commerce or readily fabricated. It is preferably of copper with the exception of the star conductor 73 which is preferable aluminum. For example, refrigerant conductor 70 with star conductor inside is available from Wolverine Division, 2651 E. 21st, Tulsa, OK 74114, and from other sources. Jacket 71 is conventional copper tubing which is readily available.

The primary refrigerant-liquid heat exchanger 48 is also readily fabricated from conventional items readily available as items of commerce or readily fabricable.

The unique connection design on each end of the exchanger provide for leak free connection. This also provides for ready determination of the location of any leaks. A very definite advantage is found in the refrigerant conductors passing through the cap joint without a connection so that only the water jacket need be sealed around them. The connection of the ends of the refrigerant conductors 80 to distributer fittings 82 outside of the water jacket provides for ready solder sweat seals and easy checkability for leaks of refrigerant.

The aqueous liquid circulated through the second refrigerant-aqueous liquid heat exchanger is normally water. However, when the aqueous liquid heats domestic water by way of a second exchanger with domestic water, the aqueous liquid can be mixtures of water and glycol as other compatible liquids. Suitable inhibitors can be employed.

The liquid circulated through the primary refrigerant-liquid heat exchanger is preferably an aqueous liquid. If earth coils or cased in wells are employed in the circuit, a glycol, ethylene glycol, or propylene glycol and water mixture with corrosion inhibitors and other additives to control microbes and to stabilize the mixture is presently preferred. Other alcohols, silicones, hydrocarbons and the like can be employed if desired.

In accord with the refrigerant-air heat exchanger design shown in FIGS. 9, 10, and 11, header 100 manifolds to a series of 6 refrigerant tube paths passing through the radiating fins 102, in a back and forth pattern joined by U fittings on each end until manifolding in header 101.

Thus in each of the 6 paths from header 100 to header 101, the refrigerant travels through 13 U fittings and 14 refrigerant tubes which traverse the exchanger. For example the top path passes from header 100 via opening 28 at point A206 on the grid, through the exchanger via a refrigerant tube, exits at point A206, reverses via a U fitting, passes back through the exchanger at point A204 via another refrigerant tube, reverses via U fitting from point A204 to A202, and so on via A202–B201, B201–B203, B203–C204, C204–C202, C202–D201, D201–D203, D203–D205, D205–E204, E204–E202, E202–F201, F201–F203, and into header 101 at point F203.

It should be noted that the refrigerant tubes pass through the exchanger in staggered rows, no horizontal U fittings are employed, and U fittings are either vertical or at a 45° angle to vertical, the pattern is not symetrical, and the vertical connections are maximized with regard to the 45° angle connections, having a ratio of greater than 1.64 to 1. This promotes considerably better heat exchange than the usual horizontal-vertical connections or all angle connections.

Referring to the operation of the heat pump apparatus, as visualized in FIG. 1, valve 64 is employed to control the flow of aqueous liquid through primary refrigerant-heat exchanger 48. This control of water flow is employed to control the heat load and head pressure on the compressor when in the heat mode. Thus, decreased water flow increases suction pressure on the compressor. Such control can be by manual adjustment, but is preferably by an electrically controlled valve responding to sensors.

I claim:

1. A heat pump apparatus suitable for both heating and cooling air in an interior air space by transferring heat with respect to a liquid in heat exchange relationship with an environment otherwise separated from the interior air space comprising in combination:

a refrigerant compressor, a refrigerant-air heat exchanger, a first refrigerant-liquid heat exchanger with means for communicating the liquid in heat exchange relationship with the environment separated from the interior air space, refrigerant, a first refrigerant expansion means, a second refrigerant expansion means, a first check valve means, a second check valve means, a first filter-dryer means, a second filter-dryer means, a three way valve means, and a plurality of refrigerant conduit means; connected in fluid tight communication and suitable such that:

(a) the compressed, heated, and liquified refrigerant outlet of the refrigerant compressor connects via a first refrigerant conduit means to the inlet of the three way valve means;

(b) the outlet of the three way valve means connects via a second refrigerant conduit means back to the evaporated and cooled refrigerant inlet of the refrigerant compressor;

(c) the first alternate path opening of the three way valve, which is the heating mode (for the air) outlet and the cooling mode (for the air) inlet, connects via a third refrigerant conduit means to the first refrigerant opening (inlet for the heating mode and outlet for the cooling mode) of the refrigerant-air heat exchanger situatable in the interior air space;

(d) the second refrigerant opening (outlet for the heating mode and inlet for the cooling mode) of the refrigerant-air heat exchanger connects via a fourth refrigerant conduit means; and then through a first path in one direction, comprising the first (open) check valve means, the first filter-dryer means, and the first refrigerant expansion means; and through a second path in the opposite direction, comprising the second (open) check valve means, the second filter-dryer means, and the second refrigerant expansion means; to the refrigerant opening (heating mode inlet and cooling mode outlet) of the refrigerant-liquid heat exchanger via a fifth refrigerant conduit means, the refrigerant-liquid heat exchanger having means for communicating the liquid thereof in heat exchange relationship with the external environment separated from the interior air space;

(e) the second refrigerant opening of the refrigerant-liquid heat exchanger (the heating mode outlet and the cooling mode inlet) connects via a sixth refrigerant conduit means to the second alternate path opening of the three way valve, which is the heating mode (for the air) inlet and the cooling mode (for the air) outlet thereof.

2. The apparatus of claim 1 wherein the first path of (d) downstream of the first check valve means and upstream of the first filter-dryer means is common with the second path of (d) downstream of the second check valve means and upstream of the second filter-dryer means; and wherein a sight glass means is situated in the common path.

3. The apparatus of claim 1 wherein the first refrigerant conduit means of (a) connects to the refrigerant inlet of a second refrigerant-aqueous liquid heat exchanger situatable in heat exchange relationship with a source of domestic hot water, and the refrigerant outlet of the second refrigerant-aqueous liquid heat exchanger connects to the inlet of the three way valve means via a seventh refrigerant conduit means.

4. The apparatus of claim 3 wherein a third filter-dryer means is connected in the seventh refrigerant conduit means, and the refrigerant is a halogenated hydrocarbon.

5. The apparatus of claim 2 wherein the refrigerant is chlorodifluoromethane, wherein a third filter-dryer means is connected in the seventh refrigerant conduit means, wherein the refrigerant-air heat exchanger is an evaporator with a fan positioned to pass air therethrough, wherein each of the refrigerant-liquid heat exchangers comprises an inner tube through which the refrigerant is passed surrounded radially by a jacket forming an annulus through which an aqueous liquid is passed, wherein domestic water is passable through the second refrigerant-aqueous liquid heat exchanger to provide a source of domestic hot water, and wherein the aqueous liquid of the first refrigerant-liquid heat exchanger is passable in heat exchange relationship which the earth prior to passing through the refrigerant-liquid heat exchanger.

6. The apparatus of claim 5 wherein the aqueous liquid jacket of the refrigerant-liquid heat exchanger is connected in a circuit comprising a circulating pump and an earth coil buried below the frost line.

7. The apparatus of claim 5 wherein the aqueous liquid jacket of the refrigerant-liquid heat exchanger is connected in a circuit comprising a circulating pump and a cased well wherein the liquid circulates in one direction through a tubing string and in the other in the annulus between the tubing string and the casing.

8. The apparatus of claim 1 wherein the refrigerant-liquid heat exchanger comprises an outer jacket tube, a refrigerant conductor running within the outer jacket tube and forming an annulus thereby, the outer jacket tube being terminated and sealed on each end by a cap joint having a fitting opening through which the refrigerant conductor extends and is sealed therearound, the refrigerant conductor having a heat conductor extending through its length within the outer jacket tube and extending from the radial center of the refrigerant conductor to its inner surface with a multiplicity of radiating extensions, the extension having substantial heat conducting contact with the inner surface of the refrigerant conductor, the outer jacket tube having an opening near each end for passage of the liquid.

9. The apparatus of claim 5 wherein the refrigerant-liquid heat exchanger comprises an outer jacket tube, three refrigerant conductors running within the outer jacket tube and substantially snugly fitting within its cross section thereby forming a four segmented annulus as viewed in cross section, the outer jacket tube being terminated and sealed on each end by a cap joint having three fitting openings through which the refrigerant conductors extend and are sealed therearound, each refrigerant conductor having a heat conductor therein extending through its length within the outer jacket tube and extending from the radial center of each refrigerant conductor to its inner surface with a multiplicity of radiating extensions, the extensions each having a foot member having substantial heat conducting contact with the inner surface of the respective refrigerant conductor, the outer jacket having an opening near each end for passage of the liquid, each of the three refrigerant conductors on each end sealed to and manifolded within a distributor fitting.

10. The apparatus of claim 1 wherein the refrigerant-air heat exchanger comprises an evaporator comprising:
(a) exchanger means comprising a multiplicity of radiating fins having a multiplicity of openings through which a multiplicity of refrigerant tubes pass at right angles and parallel to each other in a pattern of staggered rows as viewed in cross section, and
(b) a means for moving air through the exchanger means, wherein: one-half less two of the first upstream vertical row of refrigerant tubes are manifolded and sealed on one end to a header, one-half less two of the last downstream vertical row of refrigerant tubes are manifolded and sealed on one end to a second header, all other ends of refrigerant tubes are sealingly connected by U fittings, wherein U fittings either connect from one row to the next at a 45° angle or perpendicular to the direction of air flow, and wherein the ratio of perpendicular to 45° angle connections of the U fittings is greater than 1.64 to 1.

11. The apparatus of claim 5 wherein the refrigerant-air heat exchanger comprises an evaporator comprising:
(a) exchanger means comprising a multiplicity of radiating fins having a multiplicity of openings through which a multiplicity of refrigerant tubes pass at right angles and parallel to each other in a pattern of staggered rows as viewed in cross section, and
(b) a means for moving air through the exchanger means,
wherein: one-half less two of the first upstream vertical row of refrigerant tubes are manifolded and sealed on one end to a header, one-half less two of the last downstream vertical row of refrigerant tubes are manifolded and sealed on one end to a second header, all other ends of refrigerant tubes are sealingly connected by U fittings, wherein U fittings either connect from one row to the next at a 45° angle or perpendicular to the direction of air flow, and wherein the ratio of perpendicular to 45° angle connections of the U fittings is greater than 1.64 to 1.

12. The apparatus of claim 9 wherein the refrigerant-air heat exchanger comprises an evaporator comprising:
(a) exchanger means comprising a multiplicity of radiating fins having a multiplicity of openings through which a multiplicity of refrigerant tubes pass at right angles and parallel to each other in a pattern of staggered rows as viewed in cross section, and
(b) a means for moving air through the exchanger means,
wherein: one-half less two of the first upstream vertical row of refrigerant tubes are manifolded and sealed on one end to a header, one-half less two of the last downstream vertical row of refrigerant tubes are manifolded and sealed on one end to a second header, all other ends of refrigerant tubes are sealingly connected by U fittings, wherein U fittings either connect from one row to the next at a 45° angle or perpendicular to the direction of air flow, and wherein the ratio of perpendicular to 45° angle connections of the U fittings is greater than 1.64 to 1.

13. The apparatus of claim 12 wherein domestic hot water passed through the second refrigerant aqueous liquid heat exchanger is pressured to a humidifier head for adding humidity to air passed through the evaporator and wherein the domestic hot water passed to the humidifier head is controlled by a valve.

* * * * *